US005968634A

United States Patent [19]

[11] Patent Number: 5,968,634

[45] **Date of Patent: *Oct. 19, 1999**

Heeg et al.

[54] HEAT FIXING PAPER OR SHEET

[75] Inventors: Jan Rose Heeg; Rolfe Frank Kruckas; Ashok Murthy; Stephen Todd Olson; Jeanne Marie Saldanha-Singh; Rita Sharma; Ajay Kanubhai Suthar, all of Lexington; Richard Barber Watkins, Frankfort; Joe Williams Woods, Lexington, all of Ky.

[73] Assignee: Lexmark International, Inc., Lexington, Ky.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/872,356

[22] Filed: Jun. 10, 1997

Related U.S. Application Data

[63] Continuation of application No. 08/389,865, Feb. 17, 1995, Pat. No. 5,741,572.

[51] Int. Cl.$^{6}$ .......... B32B 3/00

[52] U.S. Cl. .......... 428/195; 428/409; 428/411.1; 428/425.1; 428/478.8; 428/481; 428/507; 428/537.5; 162/10

[58] Field of Search .......... 430/47, 99, 124; 428/211, 537.5, 500, 195, 409, 411.1, 425.1, 478.8, 496, 507; 427/194, 195, 288, 375, 391

[56] References Cited

U.S. PATENT DOCUMENTS

| | | | |
|---|---|---|---|
| 3,484,237 | 12/1969 | Shattuck et al. . | |
| 4,294,873 | 10/1981 | Hartmann et al. | 427/391 |
| 4,925,763 | 5/1990 | Tsubuko et al. | 430/106 |
| 4,968,752 | 11/1990 | Kawamoto et al. | 525/194 |
| 5,210,138 | 5/1993 | Yamamoto et al. | 525/183 |
| 5,291,255 | 3/1994 | Britto et al. | 355/285 |
| 5,308,729 | 5/1994 | Beach et al. | 430/115 |
| 5,352,557 | 10/1994 | Matsuoka et al. | 430/116 |
| 5,427,840 | 6/1995 | Imamura et al. | 428/195 |

FOREIGN PATENT DOCUMENTS

| | | |
|---|---|---|
| 24 54 047 | 5/1975 | Germany . |
| 59-174850 | 10/1984 | Japan . |

OTHER PUBLICATIONS

Mark S.M. Alger, *Polymer Science Dictionary*, Elsevier Applied Science, NY Published 1989, p. 224.

English Abstract of JP–A–59005249 published Jan. 12, 1984.

Patent & Trademark Office English—Language Translation of German Patent DT 24–54047 A1 (Pub. May 1975).

Patent & Trademark Office English—Language Translation of Japanese Patent 59–174850 (Pub Oct. 1984).

*Primary Examiner*—William Krynski
*Assistant Examiner*—Michael E. Grendzynski
*Attorney, Agent, or Firm*—John A. Brady

[57] ABSTRACT

A paper or transparency receiving toner to be fixed by heat has an ionomeric resin on its outer surface. For universal application, the outer layer is a blend of non-ionomeric resin, such as styrene acrylate copolymer, and an ionomer, which permits the material of the toner to molecularly intermingle with the blend during heat fixing. Irradiation raises the melting point of the ionomeric resin to prevent delamination. The resulting printing is strongly bonded to the substrate and is of excellent quality.

8 Claims, No Drawings

HEAT FIXING PAPER OR SHEET

CONTINUATION APPLICATION

This application is a continuation of application Ser. No. 08/389,865; filed Feb. 17, 1995, now U.S. Pat. No. 5,741,572.

TECHNICAL FIELD

This invention relates to imaging, such as printing or copying, on a treated paper or other substrate with fixing by heat. Fixing is typically done because the imaging is by electrophotography and the image is a loose powder toner.

BACKGROUND OF THE INVENTION

Imaging processes employing powdered toner are now very common. The toner may be applied as a dry powder or may be applied from a liquid. When applied from a liquid, the liquid portion does not transfer to the substrate in large amounts and solid toner particles carried by the liquid form a dry or damp powder image. To coalesce and bind the toner image to the substrate, one or more steps are taken, known collectively as fixing the image. Although various ways of fixing are known, such as the application of solvent, fixing by heat is very predominant in current technology. Fixing by heat avoids the addition of new materials to the system, which are a separate expense and which must be kept out of the atmosphere or otherwise kept from being an environmental hazard to the users.

However, heat fixing does not necessarily bind the powder firmly to the substrate and does not necessarily preserve well the image being fixed. Where ordinary paper is the substrate, the material of the toner, depending on its composition, may not flow sufficiently under heat to enter the fibers of paper and be firmly fixed. Toners of other compositions may flow too much into the paper and thereby lose edge definition and also appear gray rather than intense in color. Where the substrate has a continuous surface of organic material, such as polyester to function as a transparency, the toner, once again depending on its composition, may not bind well to the substrate or may wet the substrate and lose edge definition.

This invention employs properties of ionomeric resins to achieve exceptional imaging with heat fixing. lonomer resins are organic resins having polar substituents which are cross linked by metals between such substituents. They are known to be tough, scratch resistant, transparent, and readily melted by heat. U.S. Pat. Nos. 5,210,138 to Yamamoto et al and 4,968,752 to Kawamoto et al disclose ionomeric resins and their properties. The Yamamoto patent mentions their transparency and their use as packaging skins.

This invention may improve results for virtually any heat fixing application. Fixing of images is particularly difficult in full color systems, in which up to four layers of toner are accumulated (three primary colors and black) and then fixed. U.S. Pat. No. 5,291,255 to Britto et al and assigned to the same assignee to which this application is assigned, is illustrative of such a imaging system and is directed to heat fixing. Although the fixing is completed in that patent at the transfer step, fixing after the transfer step is clearly an alternative.

Ionomeric resins have been used for their special properties as resins of toners. U.S. Pat. No. 4,925,763 to Tsubuko et al discloses ionomeric resins for both liquid and dry toner and states that "the fixing performance of the toner particles increases as the fused toner particles are cooled and become hard, because of the intensified ionomeric bond." The toners of ionomeric resin are also said to be excellent in development performance.

U.S. Pat. No. 5,308,729, to Beach et al and assigned to the assignee of this invention employs a blend of an ionomeric resin and the acid form of that resin in a liquid toner application, and the "Background of the Invention" portion of that patent discloses other such teachings of the use of ionomeric resins. Images from such liquid developer are said to provide good-resolution print and fixing at relatively moderate temperature. Fuse grade, which is resistance to rubbing and scratching, is said to be good. U.S. Pat. No. 5,352,557 to Matsuoka et al is to a liquid developer employing ether liquid as the carrier liquid, and the resins are said to preferably have polar groups including "copolymers of acrylic acid and methacrylic acid or its ester and ethylene, or ionomer of the copolymers which are ionically crosslinked."

Use of an ionomer resin on the paper or other transfer sheet is not known to appear in the prior art.

DISCLOSURE OF THE INVENTION

Exceptional results are obtained by employing an ionomer resin as the surface of the final paper or other final substrate. Where the substrate body is paper, the ionomer resin is flowed around the paper fibers to form a mechanical bond. Where the substrate is to be a transparency, it may be entirely of ionomer resin as sheets of known ionomer resins are transparent. Where the body of toner to be fixed is an ionomer resin, excellent results are obtained by the sheet surface also being the ionomer resin.

Transfer sheets of more general usage in accordance with this invention have at least the extreme outer layer of a blend of a major part of the ionomer resin and a major part of non-ionomer resins, such as polystyrene, polyolefrns, ethylene acrylate copolymers, and styrene acrylate copolymer. In a fixing operation, when the outer layer is melted or softened to flow under heat, resin in a toner image will be at least somewhat compatible and therefore molecularly intermingle with the two resins. Upon cooling, the ionomer resin will again become tough and hard, giving excellent binding to the surface of the paper or other substrate. lonomer resins do not tend to spread or disperse, either on a solid surface or on paper, and therefore the toner image is well preserved and remains on the surface during and after heat fixing.

For certain applications, particularly transparencies, it may be desirable to raise the softening point of the ionomeric resin layer after it is applied to the print receiving substrate. This can be done by actinic irradiation, such as by electron beam or gamma radiation, or other means.

For liquid toner applications, the oil absorbing characteristics of the resin layer are desirable for heat fixing of toner to paper or transparency. An advantage of the blends is that they are even more absorbent of an oil vehicle.

Although the advantage of absorption of oil increases with thickness of the ionomer layer and layers thinner than 5 microns can not be obtained by extrusion, even thinner layers would have some of the advantages of this invention.

BEST MODE FOR CARRYING OUT THE INVENTION

Surface Treated Paper

Ionomer resin, preferably Surlyn 1605, a trademark product of Du Pont Co., is applied to the surface of ordinary paper as a 5 micron to 25 micron thick sheet. This lamination is then heated to 100–150 degrees C. under moderate pressure briefly such as in a roll laminator. The resulting product has the consistency of paper and has an outer surface of the ionomer resin intertwined with the fibers of the paper to form a mechanical bond.

The foregoing ionomer surfaced paper may be used with heat fixing with any toner having significant ionomer resin in the body of the toner for excellent results. Fixing at sufficient temperature to melt or soften both the toner and the ionomer of the paper briefly under moderate pressure results in an image of virtually the same definition as the toner image, located at the surface of the paper, and bound to the paper very strongly. The overall result is a clear improvement over imaging on ordinary paper under the same conditions.

Alternatively, the paper is treated as above with a resin which is a blend of equal parts by weight of the foregoing ionomer resin, and non-ionomer resins such as polystyrene, polyolefins, ethylene acrylate copolymers and styrene acrylate copolymer. Application is by a sheet lamination as described for ionomer sheet of only ionomeric resin and at the same temperature. The resulting sheet will function well with a wide range of toners, whether their resin characteristics are ionomeric or not In each case the body of the toner is compatible with one of the two resins blended on the surface of the paper during fusing or fixing. At the same time the ionomer resin part resists spreading. After fixing the ionomer resin part provides toughness and continuity to the resin meshed with the paper fibers for strong bonding to the paper. Thus, the same advantages are obtained as those when the paper surface is entirely ionomeric, although in somewhat less degree.

Another alternative is to have an inside layer of only the ionomer or of a blend of ionomer and similar resin, which is followed by an extreme outer layer of the blend of ionomer and non-ionomeric resin. This provides more of the advantages of the ionomer resin, while permitting the toner to contact and therefore mingle with the blend. Application of the two layers can be by successive melting or softening of sheets of first a 5 micron to 25 micron thick sheet of the entirely ionomer resin and then a 5 micron to 25 micron thick sheet of the non-ionomer resin.

Of course, application of the surface may take many other forms, such as melt extrusion and spraying from a dispersion of the resin. The coating art is very well developed and virtually any coating technique would be expected to be readily executed for coating paper or readily adapted for purposes of this invention.

Transparent Sheets

Although a single, thick sheet of ionomer resin functions well as an transparency and is inexpensive, it lacks rigidity. Accordingly, a polyethylene terephthalate sheet is employed and a 12 micron thick sheet of ionomer or the blend resin of the foregoing paper embodiments are laminated to it by heat. The temperature must be sufficiently high to soften just the ionomer sheet briefly, with the two sheets held together with some pressure. Fixing on the resulting sheets is as described above for paper. The ionomer resin helps maintain the toner image on the surface, resulting in a more intense image. After fixing the ionomer resin provides strong bonding of the image to the surface. Where the body of the toner is not significantly ionomeric, the transparency surfaced with the blend of resins is used and the same advantages are obtained, although in somewhat less degree.

Similarly, as in the paper embodiment, an inside layer of the ionomer sheet followed by an extreme outer layer of the blend of resins provides many of the advantages of the ionomer resin.

Use of the ionomer layer eliminated visible scratches previously observed for transparencies. As with the paper embodiment, the manner of lamination of the ionomer resin or ionomer resin blend on a transparent substrate may take a wide range of forms, including melt extrusion and spraying from a dispersion of the resin. For transparencies with a support layer, surface hardening of the outer ionomer containing layer by actinic radiation is generally essential to avoid delamination by the heat of fixing. Irradiation raises the melting point of the ionomer resin.

Conclusion

As discussed, the preferred toner is one having at least a predominant part of the binder resin being an ionomer resin. The foregoing U.S. Pat. No. 5,308,729 is illustrative of such a toner. The foregoing U.S. Pat. No. 5,291,255 is illustrative of an imaging and fixing operation for which this invention is particularly well suited, since the toner being fixed has up to four layers for full spectrum color images, which renders fixing more difficult. For such liquid toner applications, the oil absorbing characteristics of the resin layer improve heat fixing, and in this respect the blends may be preferred.

Moreover, this invention, where the surface is a blend as described, is operative with virtually any developer, dry or liquid, having an organic binder resin or the equivalent. Other variations in accordance with this invention will be apparent or may be developed employing this invention.

We claim:

1. A flexible sheet for receiving printing having a body, an outer layer of a blend of an ionomer resin and a non-ionomeric resin, and an inner layer of an ionomer resin contacting said outer layer, said inner layer being firmly fixed to said body.

2. The sheet for receiving printing as in claim 1 in which said body is paper having said inner layer mechanically bonded into said paper.

3. The substrate as in claim 2 in which said non-ionomeric resin consists essentially of polystyrene, polyolefins, ethylene acrylate copolymers and styrene acrylate copolymers.

4. The sheet for receiving printing as in claim 1 in which said body is a transparent sheet having said inner layer laminated to said transparent sheet.

5. The substrate as in claim 4 said non-ionomeric resin consists essentially of polystyrene, polyolefins, ethylene acrylate copolymers and styrene acrylate copolymers.

6. The substrate as in claim 5 in which said outer layer has been hardened by actinic radiation.

7. The substrate as in claim 4 in which said outer layer has been hardened by actinic radiation.

8. The substrate as in claim 1 in which said non-ionomeric resin consists essentially of polystyrene, polyolefins, ethylene acrylate copolymers and styrene acrylate copolymers.

* * * * *

UNITED STATES PATENT AND TRADEMARK OFFICE

CERTIFICATE OF CORRECTION

PATENT NO. : 5,968,634
DATED : October 19, 1999
INVENTOR(S) : Jan Rose Heeg, Rolfe Frank Kruckas, Ashok Murthy, Stephen Todd Olson, Jeanne Marie Saldanah-Singh, Rita Sharma, Ajay Kanubhai Suthar, Richard Barber Watkins, Joe William Woods It is certified that error appears in the above-identified patent and that said Letters Patent is hereby corrected as shown below:

Claim 3,
Line 1, Change “substrate” to read -- sheet --.

Claim 5,
Line 1, Change “substrate” to read -- sheet --.

Claim 6,
Line 1, Change “substrate” to read -- sheet --.

Claim 7,
Line 1, Change “substrate” to read -- sheet --.

Claim 8,
Line 1, Change “substrate” to read -- sheet --.

Signed and Sealed this

Twenty first Day of August, 2001

*Attest:*

Nicholas P. Godici

NICHOLAS P. GODICI

*Attesting Officer* — *Acting Director of the United States Patent and Trademark Office*